Figure 1:
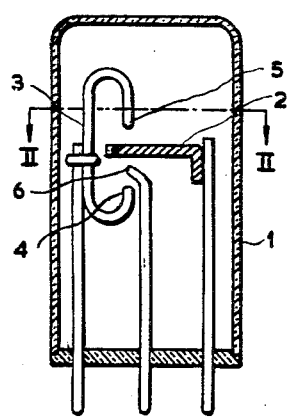

June 7, 1960 T. P. J. BOTDEN ET AL 2,940,012
POTENTIAL INDICATING DEVICE
Filed July 7, 1958

INVENTOR
THEODOOR PETER JOHANNES BOTDEN
JOHANNES ALOYSIUS VAN LEEUWEN
ZEGER VAN GELDER
BY
AGENT

United States Patent Office 2,940,012
Patented June 7, 1960

2,940,012
POTENTIAL INDICATING DEVICE

Theodoor Peter Johannes Botden, Johannes Aloysius van Leeuwen, and Zeger van Gelder, all of Eindhoven, Netherlands, assignors to North American Philips Company, Inc., New York, N.Y., a corporation of Delaware Filed July 7, 1958, Ser. No. 746,733

Claims priority, application Netherlands July 8, 1957

5 Claims. (Cl. 315—169)

This invention relates to apparatus for indicating potential differences of at most a few volts using a glow discharge tube, more particularly apparatus for indicating potential differences between the electrodes of transistors. The invention also relates to glow discharge tubes for use in such apparatus.

Generally, potential differences can be indicated by means of voltmeters, however, with a sufficiently robust construction, these meters require comparatively large currents, that is to say, large with respect to the usual currents in many transistor circuit arrangements. In addition, each meter occupies an area of several sq. cms. on a panel so that the use of a large number of such meters renders the panel bulky and difficult to survey. In addition, the price of these meters is comparatively high. On the other hand, frequently it suffices to know whether or not there is a potential difference exceeding a few volts so that even the most simple voltmeter provides more information than is required.

It is an object of the present invention to provide an apparatus for indicating potential differences of at most a few volts, which is small and can be operated with a small amount of energy.

According to the invention, in an apparatus for indicating potential differences of at most a few volts which uses a glow discharge tube, this tube is constructed so that there are two possible discharge paths between the anode and the cathode which have different ignition voltages, provision being made close to the discharge path of the higher ignition voltage of an auxiliary anode which is spaced from the cathode by a distance such and/or has a bias voltage applied to it such that when the potential difference to be detected is applied in the positive sense to the auxiliary anode, the discharge is produced in the path of the higher ignition voltage while, with insufficient potential difference, it is produced in the path of the lower ignition voltage, whilst owing to the capacity between the anode and the cathode the discharge is intermittent with an RC-time of the order of 1 msec. in accordance with the de-ionization time of the gas filling used, the RC-time of the auxiliary discharge path being small compared with that of the main discharge path.

According to the invention, preferably the same bias voltage is applied to the main and auxiliary anodes, which is simpler.

For small currents, the anode-cathode capacity can be sufficient.

The auxiliary anode with its own current-limiting series-resistance is preferably connected directly to the anode supply lead, since this renders the circuit arrangement less sensitive to variations in the ignition voltage or to slow de-ionization. Preferably, the current-limiting resistance for the main discharge path is connected in the cathode lead, since this enables the voltage to be detected to be connected to earth together with the positive terminal of the voltage supply for the main discharge.

Thus, the apparatus in accordance with the invention includes a glow discharge tube having two discharge paths, the discharge following either one path or the other in accordance with the potential difference to be detected.

The current strength in the main discharge may vary between wide limits. With a mean value of this current of a few tenths of a milliampere, a very satisfactory indication is obtained. In this event, the peak current in the main discharge path is a few tenths of milliamperes. The auxiliary anode current, which must be supplied by the circuit arrangement to be measured, need have a mean value of a few microamperes only with peak currents of a few tenths of microamperes, and this is of advantage for the circuit arrangements which can supply only little current.

By covering one of the two discharge positions, the indication of a voltage difference is facilitated.

The anode may be an open loop of wire between the ends of which a cathode member is arranged so as to be spaced from the anode ends by different distances.

The cathode may alternatively be a bent plate the two parts of which are spaced from the anode by different distances.

Figure 5:
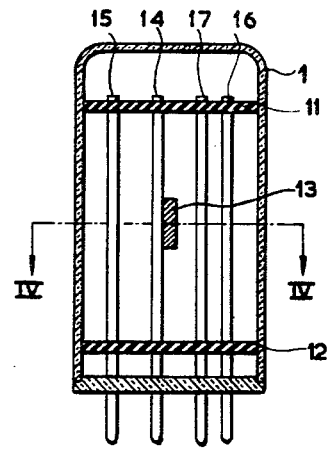
Figure 2:
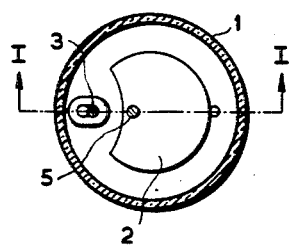
Figure 4:
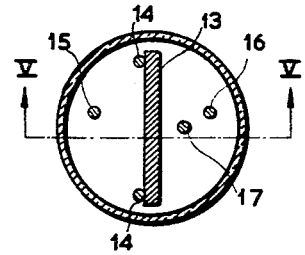
Figure 3:
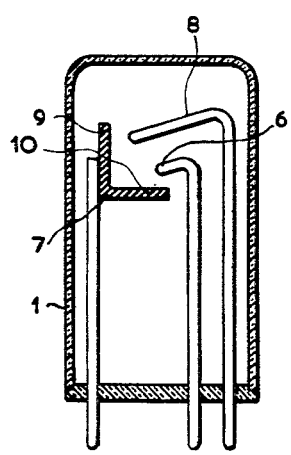
Figure 6:
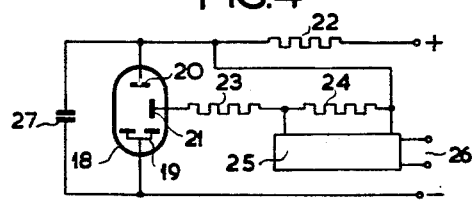
Figure 7:
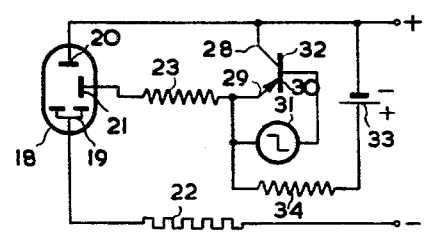

In order that the invention may readily be carried out, some embodiments thereof will now be described, by way of example, with reference to the accompanying drawings, in which Figures 1 and 2 are cross-sectional views of one embodiment of a glow discharge tube in accordance with the invention, Fig. 3 is a sectional view of another embodiment, and Figures 4 and 5 are sectional views of a third embodiment, while Figures 6 and 7 show two circuit arrangements in accordance with the invention.

In Figures 1 and 2, reference numeral 1 denotes a glass envelope in which a cathode 2 consisting of a flat plate of molybdenum is arranged on a stay wire. The anode 3 consists of a wire loop the ends 4 and 5 of which are spaced away from the cathode by distances of 2.0 and 1.0 mms. respectively. An auxiliary anode 6 is arranged adjacent the end 4 of the cathode so as to be spaced away therefrom by a distance of 1.1 mms. The tube is filled with neon with 0.1% of argon under a pressure of 27 cms. of mercury.

In Fig. 3, the cathode is a plate 7 bent into the shape of an L opposite which provision is made of a filamentary anode 8 spaced away from blades 9 and 10 of the cathode by distances of 1 and 2 mms. respectively. The auxiliary anode is again denoted by 6. The gas filling is the same as in Figures 1 and 2.

In Figures 4 and 5, two mica plates 11 and 12 are clamped in the envelope 1, a flat cathode plate 13 being interposed between them by means of stay wires 14. The two parts 15 and 16 of the main anode are spaced 0.4 and 0.8 mm. respectively from the cathode. An auxiliary anode 17 is spaced 0.6 mm. from the cathode. The tube is filled with neon with 0.1% of argon under a pressure of 10 cms. of mercury. The cathode is made of nickel which is coated with barium oxide.

In Fig. 6, the tube is indicated schematically by 18, the bipartite cathode by 19, the main anode by 20 and the auxiliary anode by 21. The cathode is connected to the negative terminal of a voltage supply of 150 volts the positive terminal of which is connected, through a resistor 22 of 0.2 MΩ, to the anode. An auxiliary anode 21 is connected to the anode end of the resistor 22 through the series-combination of a resistor 23 of 1 MΩ and a resistor 24 of 2 kΩ. The resistor 24 is connected in a circuit 25 such that, depending whether or not a signal is supplied to terminals 26, the resistor 24 passes a current of from 2 to 3 ma. Whether or not the resistor 24 passes current depends upon the presence or absence of a potential difference of from 4 to 6 volts between the main anode and the auxiliary anode, which is amply sufficient to cause the discharge to the cathode 19 to shift its position. With a careful construction, 2 volts is more than sufficient. A capacitor 27 of 18 kpf. is connected between anode and cathode. The mean value of the main current in the tube is 200 micro-amperes and the mean value of the current through the auxiliary anode 3 micro-amperes.

Fig. 7 is distinguished from Fig. 6 in that the current-limiting resistor 22 is connected in the cathode lead while the resistor 24 is replaced by the connection of a collector 28 and an emitter 29 of a transistor 30. The emitter 29 of the transistor 30 is connected to the base 32 through a signal voltage supply 31. A battery 33 and a resistor 34 are connected between the collector and the emitter. In the absence of a signal, the transistor 30 passes no current so that the entire voltage of the battery 33 is set up between the emitter and the collector. If the supply 31 applies a negative potential of a few tenths of volts to the base 32, the transistor is conductive so that the potential difference between the collector and the emitter is substantially zero. Thus, the position of the glow-light on the cathode indicates whether or not the transistor is conductive.

What is claimed is:

1. An indicating device for measuring potential differences up to about 10 volts comprising a glow-discharge tube adapted to operate in the glow-discharge region including an envelope containing an ionizable medium and cathode and anode electrodes defining two separate discharge paths therebetween, said cathode and anode electrodes having a given interelectrode capacitance therebetween, an auxiliary electrode disposed adjacent one of said discharge paths and defining with said cathode and anode electrodes one path of lower potential than the other path between said cathode and anode electrodes, said auxiliary electrode having with said cathode a given value of interelectrode capacitance, means to apply said potential difference to said auxiliary electrode, means to apply a potential between the anode and cathode to produce therebetween a glow-discharge, and means to apply a bias potential to said auxiliary electrode at which the discharge occurs in the path of higher potential when the said potential difference is greater than a given value and takes place in the other path when less than said given value, said cathode-anode interelectrode capacitance having a value at which the main discharge is intermittent with a time constant (RC) of the order of 1 μsec. and greater than that of the path between the auxiliary electrode and cathode.

2. An indicating device as claimed in claim 1 in which the anode potential is applied to the auxiliary electrode as the bias potential.

3. An indicating device as claimed in claim 2 further including a current-limiting resistance through which the auxiliary electrode is connected to the anode.

4. An indicating device as claimed in claim 1 further including a current-limiting resistance through which the auxiliary electrode is connected to the cathode.

5. An indicating device as claimed in claim 1 in which the potential difference to be measured is obtained from between two electrodes of a transistor.

References Cited in the file of this patent

UNITED STATES PATENTS

| | | |
|---|---|---|
| 1,924,739 | Found | Aug. 29, 1933 |
| 2,775,722 | Beck | Dec. 25, 1956 |
| 2,782,343 | Geisler | Feb. 19, 1957 |